UNITED STATES PATENT OFFICE.

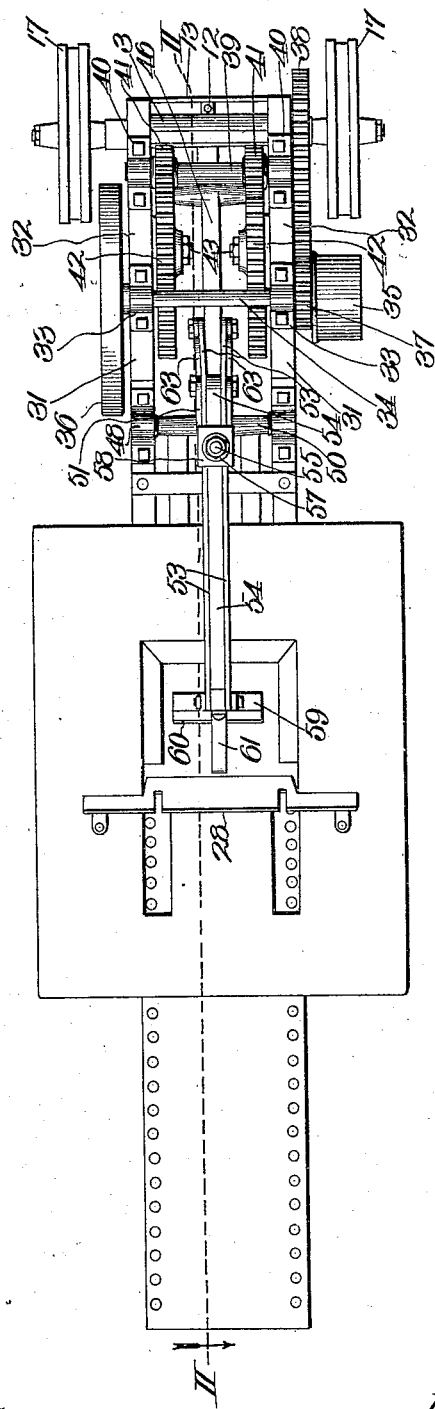

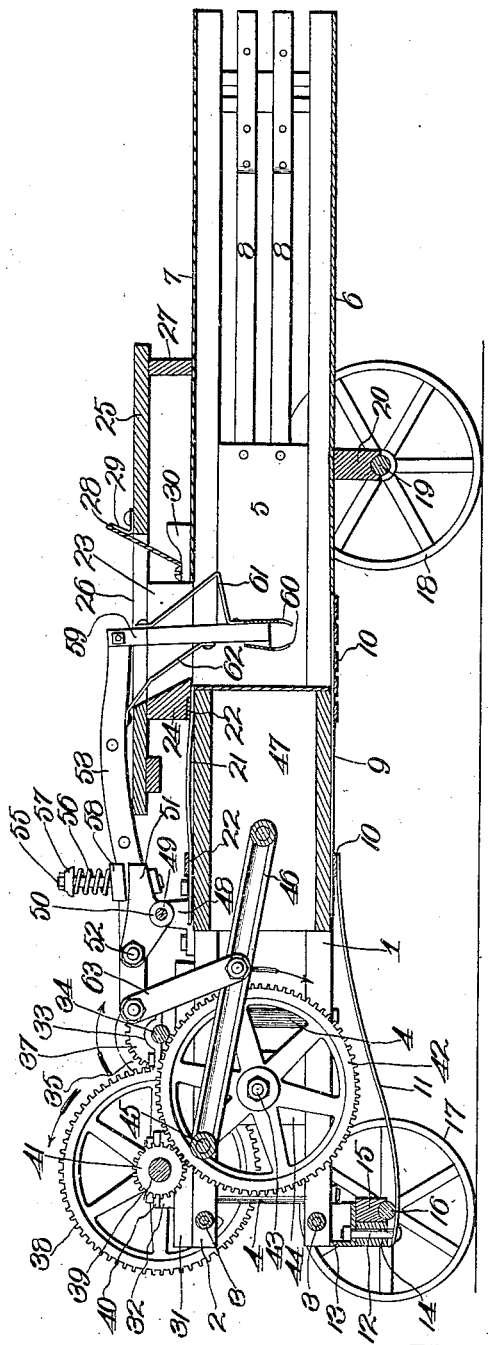

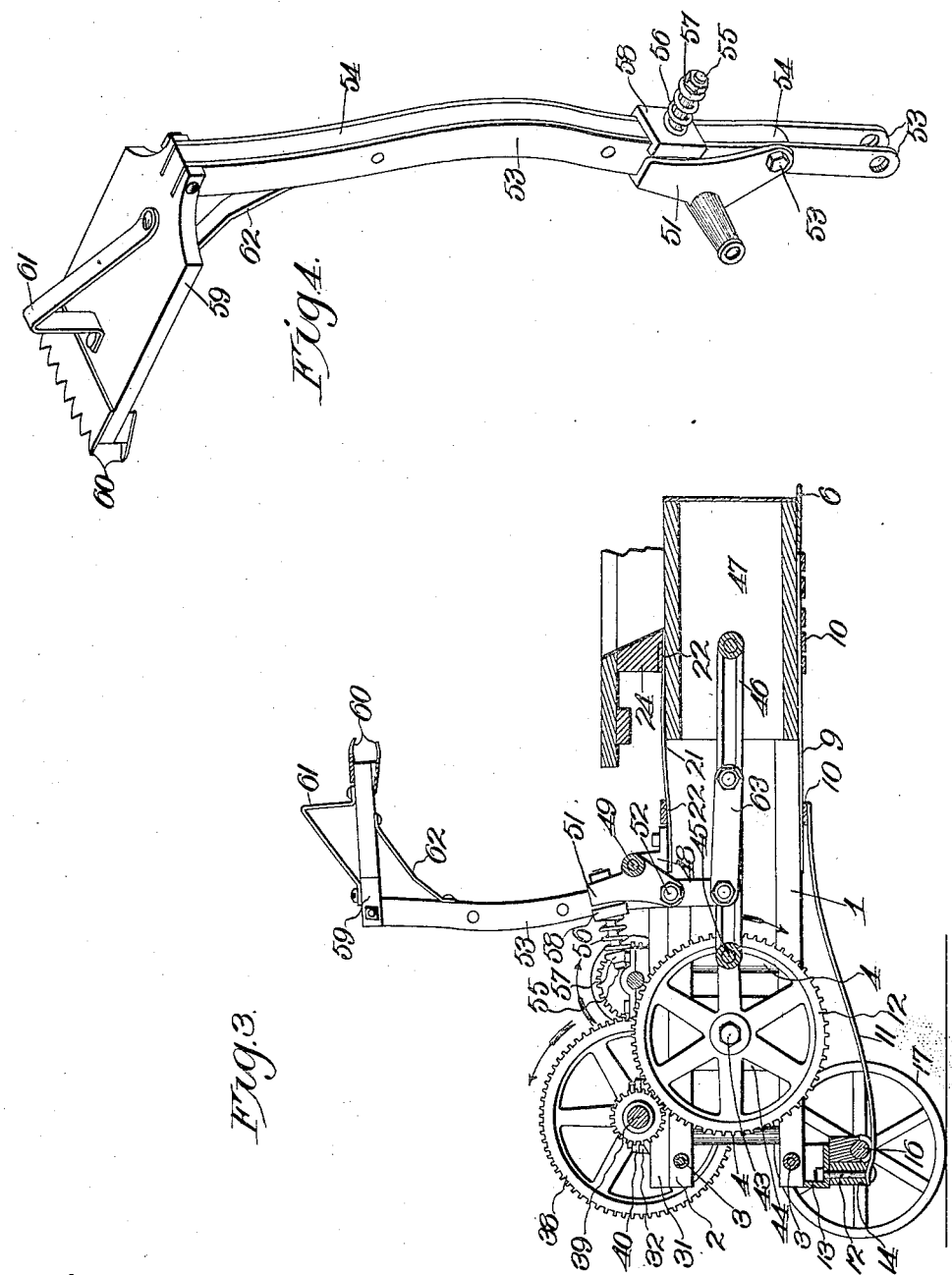

JOSIAH S. TUTTLE, OF KANSAS CITY, MISSOURI, ASSIGNOR TO THE OHIO CULTIVATOR CO., OF BELLEVUE, OHIO, A CORPORATION OF OHIO.

SELF-FEEDER FOR BALING-PRESSES.

No. 907,654.  Specification of Letters Patent.  Patented Dec. 22, 1908.

Application filed May 10, 1907. Serial No. 373,005.

*To all whom it may concern:*

Be it known that I, JOSIAH S. TUTTLE, a citizen of the United States, residing at Kansas City, in the county of Jackson and State of Missouri, have invented certain new and useful Improvements in Self - Feeders for Baling-Presses, of which the following is a specification.

This invention relates to self feeders for baling presses and more particularly for power presses in which the pitman operates in a vertical plane in effecting the power and withdrawal stroke of the plunger, and my object is to produce means whereby the downward stroke of the feeder shall be at less speed but with more power than the upward or inoperative stroke.

A further object is to produce a construction whereby the plunger is withdrawn to a position forward of the feed opening before the feeder enters the latter.

With these objects in view and others as hereinafter appear, the invention consists in certain novel and peculiar features of construction and organization as hereinafter described and claimed; and in order that it may be fully understood reference is to be had to the accompanying drawings, in which,—

Figure 1, is a plan view of a baling press embodying my invention. Fig. 2, is a longitudinal section on the line II—II of Fig. 1. Fig. 3, is a similar view of a part of the press with the plunger advanced and the feeder in its elevated position. Fig. 4, is a detail perspective view of the feeder.

In the said drawings, 1—1 indicate the lower and 2—2 the upper angle irons forming the parallel corners of a baling press and extending for the full length thereof, said corner irons being disposed rectangularly with respect to each other.

3 are cross rods connecting irons 1—1 and 2—2 respectively together and 4 are similar vertical rods connecting the vertically alined irons 1 and 2 together, it being understood in this connection that said corner irons may be connected together in any other suitable or preferred manner.

5 are plates between the vertically alined irons 1 and 2 and forming the sides of the baling chamber, 6 indicating the bottom and 7 the top of said chamber, and 8 indicates the customary side bars extending rearwardly from plates 5 and forming slots through which tie wires may be secured around the bales and also forming the exit or rear end of the press.

9 indicates one or more longitudinal plates arranged in the plane of the bottom and extending forwardly therefrom and supported preferably by a plurality of cross bars 10 secured at their ends to the corner irons, and extending forwardly and centrally from the foremost cross bar 10 is a brace bar 11 attached at its lower end to the king-bolt 12 depending from cross bar 13 connecting corner irons 1. The king-bolt also extends through a bracket 14 secured to the bolster 15 overlying the axle 16 of front wheels 17. The rear wheels 18 have their axle 19 journaled in the rear bolster 20 underlying and secured to the press at the rear end of the baling chamber proper.

21 indicates longitudinal bars secured to and underlying cross bars 22, attached at their ends to corner irons 2, bars 9 and 21 forming by preference a skeleton guide and support for the plunger hereinafter referred to.

The hopper comprises side walls 23 and the front wall 24 secured upon the baling case with the wall 24 overlying the rear cross bar 22 by preference, and disposed at the proper distance forward of the front end of the top 7 to provide a feed-opening of proper size to admit baling material in charges of the desired size.

25 indicates the usual table resting upon the hopper walls and provided with an opening 26 registering with and forming part of the hopper opening, the rear portion of the table having a depending brace bar 27 resting upon the baling case.

28 indicates a downwardly and forwardly inclined plate arranged in the opening 26 and forming the back wall of the hopper, the upper end of said plate being attached by brackets 29 to the table and the lower end by brackets 30 to the baling case.

31 indicate bars secured upon the front ends of corner irons 2, and 32 shorter bars secured upon bars 31 and forming in conjunction with caps 33, bearings for the transverse shaft 34 adapted to be driven by a belt connected to pulley 35 on one end of said shaft, the belt being omitted. 36 indicates balance or fly wheel on the opposite end of said shaft and secured also upon the shaft is a gear pinion 37 meshing with a large gear wheel 38 secured upon the cross shaft 39 journaled in bearings formed by said bars 32 and bearing caps 40.

41 are gear pinions mounted upon shaft 39 and meshing with the large gear wheels 42 journaled on stub-shafts 43 projecting inward from the vertical side plates 44 connecting each pair of bars 1 and 2 together near their front ends.

45 is a cross bolt or rod connecting gear wheels 42 together and pivoted on said rod is a pitman 46 pivoted at its rear end to and within the reciprocatory plunger 47.

48 are brackets erected upon the press forward of the hopper and carrying a cross rod 49.

50 is a shoe substantially U-shaped in cross section and pivoted for movement in a vertical plane upon rod 49, the side walls 51 of said shoe being vertical and rising from the bottom of the same. Fitting snugly between the side walls of the shoe and pivoted to the front ends of its walls as at 52 is a lever comprising a pair of parallel plates 53 and a filling strip 54 preferably of wood. A bolt 55 carried by the rear end of the shoe extends through the lever and the latter is held pressed yieldingly down upon the bottom of the shoe by the spring 56 mounted on the bolt and bearing at one end against a nut 57 on the bolt and at its opposite end against a U-shaped cap 58 engaging the sides and upper edge of the lever.

The lever is provided at its rear end with a head 59 projecting into the baling chamber when the former is substantially horizontal as shown in Fig. 2, and said head is provided with toothed plates 60 at its front end and at its rear side with an angular shoulder 61. A brace 62 connects the head and lever rigidly together and a pair of links 63 pivotally connect the front end of the lever with the pitman 46.

While I prefer the spring and bolt connection herein described, it is obvious that the feeder head may be connected to the driving mechanism for the plunger by any suitable yielding connection which may be arranged in any suitable manner, and further, that the feeder head may be actuated either from the pitman 46, as described, or from any other suitable part of the plunger-operating mechanism.

In practice the baling material is fed into the hopper in the usual or any preferred manner and the belt wheel is driven in the direction indicated by the arrow Fig. 2, so as to drive wheels 42 through the intermediate gearing in the same direction and thus impart reciprocatory movement to the plunger, the latter being shown in Fig. 2 in the position which it occupies after it has advanced about one-eighth of its stroke, the same figure showing the feeder constituted by lever 53 and head 59 fully depressed, further rearward or power stroke movement of the plunger pulling down upon links 63 and causing the feeder to swing upward on pivot 49, this action being comparatively rapid because most of it occurs while the pivotal point between wheels 42 and the pitman is moving almost directly forward, the feeder attaining the position shown in Fig. 3 at substantially the same moment that the plunger completes its power stroke. As the movement of the pitman continues in the direction indicated, from the position shown in Fig. 3, it starts to retract the plunger before perceptible movement is imparted to the feeder. The pivotal point between the pitman and links 63 travels in a course corresponding approximately to a pointed oval with the point of such course in the horizontal plane of the plunger, such point of course being at the point occupied by said pivotal point when the plunger is fully advanced as shown in Fig. 3, the rounded or semi-circular end of said figure being described as the bolt 45 travels upward forward of the axis of the wheels 42. The substantially oval or top-shape course of travel of the lower ends of links 63 results in the withdrawal of the plunger inward of the path of the feeder before the latter actually enters the feed opening so that there is no possibility of conflict. For the same reason the feeder travels slowly in the initial part of its downward movement and thus has added power when power is required to force the material down through the feed opening, the initial part of the upward movement of the feeder being rapid to give the attendant ample time to deposit a charge of baling material in the hopper before the next down or feed stroke, it being understood that the fingers and shoulder of the feeder head coöperate together in effectively forcing each charge down into the baling chamber. The two parts of the feeder pivoted together are held yieldingly together rearward of their pivotal point of connection in order to avoid or reduce to the minimum chance of breakage when the head of the feeder comes into engagement with a charge of baling material too great to permit the feeder head to move downward its full distance into the baling chamber, this yielding of the feeder in the face of an obstacle too great for it to overcome occurring without interfering with the proper operation of the plunger as will be readily understood.

From the above description it will be apparent that I have produced a feeder for power baling presses possessing the features of advantage enumerated, and I wish it to be understood that I do not desire to be restricted to the exact details of construction shown and described as obvious modifications will suggest themselves to one skilled in the art.

Having thus described the invention what I claim as new and desire to secure by Letters Patent, is:—

1. A feeder for baling presses comprising a shoe, a lever fitting in and pivoted to one end of the shoe and provided beyond the opposite end of the shoe with a rigidly depending head, a bolt secured to the shoe and extending slidingly through the lever, a cap fitting on the bolt and engaging the lever, and a spring mounted on the bolt and imposing pressure on the same and the said cap to clamp the lever yieldingly against the bottom of the shoe.

2. The combination with a baling press, of a feeder comprising a part fulcrumed upon the press, a lever pivoted to one end of said part and provided beyond the opposite end of the latter with a head, means holding said parts pressed yieldingly together at a point intermediate of said fulcrum point and head, a link connected to the opposite end of said lever from its head, and means to cause the opposite end of said link to travel in a substantially oval-shaped path.

3. In a baling press, a baling case having a feed opening, a plunger, a pitman pivoted to the plunger, means to cause the rear end of the pitman to describe a circle, a feeder comprising a part fulcrumed on the press and a second part pivoted to the first and provided rearward of such fulcrum with a head, means for holding the two parts of the feeder yieldingly together at a point intermediate of said head and said pivotal point of connection, and a link pivotally connecting the front end of the part of the feeder equipped with the head, with the pitman intermediate of its ends.

In testimony whereof I affix my signature, in the presence of two witnesses.

JOSIAH S. TUTTLE.

Witnesses:
J. P. VICKERY,
W. H. GRAY.